United States Patent
Kim

(10) Patent No.: US 9,429,214 B2
(45) Date of Patent: Aug. 30, 2016

(54) AUTOMATIC TRANSMISSION

(71) Applicant: CM PARTNER INC., Yongin-si (KR)

(72) Inventor: Geon Joon Kim, Changwon-si (KR)

(73) Assignee: CM PARTNER INC. (KR)

( * ) Notice: Subject to any disclaimer, the term of this patent is extended or adjusted under 35 U.S.C. 154(b) by 0 days.

(21) Appl. No.: 14/405,023

(22) PCT Filed: Jul. 9, 2013

(86) PCT No.: PCT/KR2013/006079
§ 371 (c)(1),
(2) Date: Dec. 2, 2014

(87) PCT Pub. No.: WO2014/168291
PCT Pub. Date: Oct. 16, 2014

(65) Prior Publication Data
US 2016/0025188 A1 Jan. 28, 2016

(30) Foreign Application Priority Data

Apr. 8, 2013 (KR) ......................... 10-2013-0037979

(51) Int. Cl.
*F16H 3/46* (2006.01)
*F16D 41/06* (2006.01)
*F16H 3/44* (2006.01)
(Continued)

(52) U.S. Cl.
CPC ................. *F16H 3/46* (2013.01); *F16D 41/04* (2013.01); *F16D 41/06* (2013.01); *F16H 3/005* (2013.01); *F16H 3/44* (2013.01); *F16H 2200/2069* (2013.01); *F16H 2200/2084* (2013.01)

(58) Field of Classification Search
CPC ............ F16H 3/44; F16H 3/46; F16H 3/005; F16H 2200/2069; F16H 2200/2084; F16D 41/04; F16D 41/06; F16D 2041/0601
See application file for complete search history.

(56) References Cited

U.S. PATENT DOCUMENTS 6,383,108 B1 * 5/2002 Yoo .......................... B62M 1/36
280/236
6,390,487 B1 * 5/2002 Yoo ........................ B62M 11/16
280/237

(Continued)

FOREIGN PATENT DOCUMENTS

| CN | 1291153 | 4/2001 | |
|---|---|---|---|
| CN | 202125527 U * | 1/2012 | ............... F16D 3/56 |
| CN | 102401028 | 4/2012 | |

(Continued)

OTHER PUBLICATIONS

Hamrock, B., Anderson, W. "Rolling-Element Bearings". Jun. 1983, NASA Reference Publication 1105. p. 17.*

(Continued)

*Primary Examiner* — Robert Hodge
*Assistant Examiner* — Lori Wu
(74) *Attorney, Agent, or Firm* — Cantor Colburn LLP

(57) ABSTRACT

An automatic transmission includes an input shaft; a hub housing; a first clutch; a planetary gear portion; and a second clutch. A locking gap of the first clutch is formed to be greater than a locking gap of the second clutch. When the hub housing is rotated in the reverse direction, the sun gear is rotated in the forward direction, the second clutch is first released before the first clutch is locked, so that the hub housing is rotated in the reverse direction and is capable of moving backward.

13 Claims, 13 Drawing Sheets

(51) Int. Cl.
  *F16H 3/00*     (2006.01)
  *F16D 41/04*    (2006.01)

(56) References Cited

U.S. PATENT DOCUMENTS 8,298,112 B2 * 10/2012 Takada .................. F16D 41/088
                                                       475/323
2010/0034617 A1 * 2/2010 Liao ..................... B24B 45/006
                                                       411/432

FOREIGN PATENT DOCUMENTS

| CN | 102401028 A | * | 4/2012 | ............. F16D 27/04 |
| CN | 102465974 A | * | 5/2012 | ............... F16D 3/52 |
| JP | 2008275150 |   | 11/2008 | |
| KR | 100641651 |   | 10/2006 | |
| KR | 1020100112974 |   | 10/2010 | |
| KR | 1020120017807 |   | 2/2012 | |
| KR | 20120129172 |   | 11/2012 | |
| KR | 1020120129172 |   | 11/2012 | |
| KR | 1020130007211 |   | 1/2013 | |
| TW | EP 2444312 A1 | * | 4/2012 | .............. B62M 6/65 |

OTHER PUBLICATIONS

International Search Report—PCT/KR2013/006079 dated Jul. 31, 2013.

Chinese Office Action—Chinese Application No. 201380029496.9 issued on May 3, 2016, citing KR 20120129172, CN 102401028, CN 1291153 and CN 202125527.

* cited by examiner

AUTOMATIC TRANSMISSION

TECHNICAL FIELD

This invention relates to an automatic transmission, and more particularly, to an automatic transmission that is capable of changing speed and moving forward or backward without using an additional device.

BACKGROUND ART

A planetary gearbox is a combination of gears in a state in which sun gears, ring gears and planetary gears are disposed in a concentric line.

In the case of an identical gear ratio, the planetary gearbox has a small volume, a concentric input/output and high power transmission efficiency compared to a gear train disposed in a gearbox that operates based on a different principle and thus is widely used in the field in which small size and lightweight are required.

In the related art, Korean Patent Application No. 10-2005-0132839 discloses a self centering type assembling device for a planetary reduction gear so as to obtain a large gear ratio by applying the planetary gear.

However, in Korean Patent Application No. 10-2005-0132839 that is the related art, a reverse rotational force of an input portion cannot be converted into a forward direction.

In order to solve the conventional problem, Korean Patent No. 1,190,755 discloses a star type forward • reverse one way transmission.

In the transmission disclosed in Korean Patent No. 1,190,755, a forward rotational force transferred through a power transmission unit is transferred to a main carrier using a forward ratchet so that the forward rotational force can be output in a forward direction.

In the transmission disclosed in Korean Patent No. 1,190,755, a reverse rotational force transferred through the power transmission unit is transferred to an internal carrier using a reverse ratchet, and a large output in the forward direction can be obtained while the speed of the carrier is reduced, using a sun gear and a planetary gear engaged with the other side of the internal carrier and a ring gear of an external carrier.

However, in Korean Patent No. 1,190,755 that is the related art has a critical problem that the main carrier cannot move backward.

PRIOR ART DOCUMENT

Patent Document

Korean Patent No. 1,190,755
Korean Patent Application No. 10-2005-0132839

SUMMARY OF INVENTION

Technical Problem

The present invention provides an automatic transmission in which a clutch is provided so that a forward driving force is output from a hub housing in a forward direction and a reverse driving force is output from the hub housing in the forward direction at a large gear ratio when the driving force is transmitted through an input shaft and if the hub housing is input in the forward direction, the hub housing can be rotated in the forward direction without any change and in particular, when the hub housing is rotated in a reverse direction, a planetary gear portion is not locked and is released and thus, the hub housing can move backward.

Solution to Problem

According to an aspect of the present invention, there is provided an automatic transmission including: an input shaft that is rotatably installed on a fixing shaft; a hub housing into which the input shaft is inserted; a first clutch, of which one side is installed on the input shaft and the other side is installed at the hub housing; a planetary gear portion including a carrier having a satellite gear that is engaged between a ring gear formed on inner walls of the hub housing and a sun gear formed on the input shaft; and a second clutch, of which one side is installed on the planetary gear portion and the other side is installed on the hub housing, wherein the first clutch and the second clutch may include one-direction clutches that are locked in opposite directions, and when the hub housing is rotated in a reverse direction, the second clutch may be released prior to the first clutch.

When the input shaft is rotated in a forward direction, the first clutch may be locked, and the second clutch may be released so that the hub housing can be output in the forward direction. And when the input shaft is rotated in the reverse direction, the first clutch may be released, and the second clutch may be locked so that the ring gear can be rotated in the forward direction due to the satellite gear of the planetary gear portion that is rotated in the forward direction and the hub housing is decelerated and is output in the forward direction. And when the hub housing is rotated in the forward direction, the second clutch may be released, and the hub housing may be rotated in the forward direction, and a locking gap of the first clutch may be formed to be greater than a locking gap of the second clutch. And when the hub housing is rotated in the reverse direction, the sun gear may be rotated in the forward direction, the second clutch may be first released before the first clutch is locked, so that the hub housing can be rotated in the reverse direction and can move backward.

The second clutch may include: a first sub-clutch that is connected to an opposite side of the satellite gear installed at the planetary gear portion and confines rotation of the carrier in the reverse direction; a second sub-clutch is connected to and installed at the first sub-clutch; a third sub-clutch connected to a cover housing and configured to confine rotation of the hub housing in the reverse direction, wherein one side of the third sub-clutch is installed at the hub housing and the other side of the third sub-clutch is connected to the second sub-clutch, locking of the second sub-clutch linked to the third sub-clutch may be released prior to the first clutch and the first sub-clutch.

The first clutch may include: a first male buffering block having first protrusion portions and fixed to the input shaft; a first female buffering block connected to the first male buffering block in a state in which first hanging jaws on which the first protrusion portions are hung, are formed; a spring installed between one of the first protrusion portions and one of the first hanging jaws; a first clutch block, of which one side is fixed to the hub housing and which is fitted onto the first female buffering block; and a first buffering clutch including a first clutch bearing installed between the first female buffering block and the first clutch block.

The first clutch may include: a first needle block fixed to the input shaft; a first clutch block fitted onto the first needle block and connected to the hub housing; a first retainer installed between the first needle block and the first clutch block; and a first needle clutch including a plurality of first needle pins installed at the first retainer.

The second clutch may include: a second clutch block connected to the hub housing; a second needle block fitted onto the second clutch block and fixed to the carrier; a second retainer inserted between the second clutch block and the second needle block; and a second needle clutch including a plurality of second needle pins installed at the second retainer.

The second clutch may include: a second male buffering block having second protrusion portions and connected to the hub housing; a second female buffering block fixed to the carrier and connected to the second male buffering block in a state in which second hanging jaws on which the second protrusion portions are hung are formed; and a second buffering clutch including a spring installed between one of the second protrusion portions and one of the second hanging jaws.

The second clutch may include: a second clutch block fitted onto the fixing shaft; a third clutch block fitted onto the second clutch block and fixed to the carrier; and a one way clutch including a second clutch bearing installed between the second clutch block and the third clutch block.

The second sub-clutch may include: a concentric block installed on the fixing shaft with a gap; and a concentric spring installed between a stop washer installed on the fixing shaft and the concentric block.

The third sub-clutch may include: a fourth clutch block fitted onto the fixing shaft; a fifth clutch block fitted onto the fourth clutch block and fixed to the cover housing installed at the hub housing; and a fourth clutch bearing installed between the fourth clutch block and the fifth clutch block.

The second sub-clutch may include: a second clutch block fitted onto the concentric block; a third retainer installed between the second clutch block and the concentric block; and a clutch shoe installed at the third retainer, and the third retainer may be fixed to the fourth clutch block.

The first needle block may include: a first groove that is close to the first retainer; a second groove that slantly extends from the first groove; and a third groove that extends from the second groove and accommodates the first needle pin, and the second needle block may include: a fourth groove that is close to the second retainer; and a fifth groove that slantly extends from the fourth groove, and a length of the second groove may be greater than a length of the fifth groove.

Advantageous Effects of Invention

As described above, the present invention has the following effects.

First, a hub housing can be rotated in a reverse direction so that an automatic transmission according to the present invention can move backward.

Second, the automatic transmission can perform transmission and move forward or backward without using an additional device.

Third, even though the hub housing is rotated in the reverse direction and is capable of moving backward, the hub housing can be output in the forward direction at a constant gear ratio when an input shaft is rotated in a forward direction, and the hub housing can be output in the forward direction at a large gear ratio when the input shaft is rotated in the reverse direction.

Fourth, a second clutch may include several sub-clutches so that a clutch suitable for environment can be selected.

Fifth, a first clutch may include a first needle clutch or a first buffering clutch so that component replacement and manufacturing can be very easily performed.

Sixth, a second sub-clutch may include one of a needle clutch, a buffering clutch and a one way clutch so that component replacement and manufacturing can be very easily performed.

Seventh, since a locking gap of the first clutch is formed to be greater than a locking gap of the second clutch, the second clutch gets loose prior to the first clutch when the hub housing is rotated in the reverse direction so that locking is released and the automatic transmission can easily move backward.

Eighth, a concentric block with a gap is installed so that a moving-backward operation of the hub housing can be smoothly performed when the hub housing is rotated in the reverse direction.

Ninth, the locking gap of the first clutch and a locking gap of the second buffering clutch, a second needle clutch or a one way clutch are formed to be greater than the locking gap of the second sub-clutch so that the second sub-clutch linked to a third sub-clutch is unlocked prior to the first clutch when the hub housing is reversely rotated and thus the moving-backward operation of the hub housing can be smoothly performed when the hub housing is rotated in the reverse direction.

| | |
|---|---|
| 100: first clutch | 110: first clutch block |
| 111: first spring | 112: second spring |
| 113: third spring | 114: fourth spring |
| 115: first clutch bearing | 121: first male buffering block |
| 122: first female buffering block | 130: first protrusion portion |
| 131: first protrusion | 132: second protrusion |
| 133: third protrusion | 134: fourth protrusion |
| 140: first hanging jaw | 141: fifth protrusion |
| 142: sixth protrusion | 143: seventh protrusion |
| 144: eighth protrusion | 150: first buffering clutch |
| 160: input shaft | 170: first retainer |
| 171: first needle pin | 172: first needle block |
| 173: first groove | 174: second groove |
| 175: third groove | 200: second clutch |
| 210: first sub-clutch | 211: second needle block |
| 212: second needle pin | 213: second retainer |
| 214: second clutch block | 215: fourth groove |
| 216: fifth groove | 220: second hanging jaw |
| 221: second protrusion portion | 222: fifth groove |
| 223: sixth spring | 224: seventh spring |
| 225: eighth spring | 226: second male buffering block |
| 231: second clutch bearing | 232: concentric spring |
| 240: second sub-clutch | 241: third clutch bearing |
| 242: third retainer | 243: clutch shoe |
| 244: spline portion | 245: concentric block |
| 250: third sub-clutch | 251: fourth clutch block |
| 252: fifth clutch block | 253: fourth clutch bearing |
| 300: planetary gear portion | 310: sun gear |
| 320: satellite gear | 330: carrier pin |
| 340: carrier | 350: ring gear |
| 400: hub housing | 410: cover housing |
| 500: fixing shaft | 610: first bearing |
| 620: second bearing | 630: third bearing |
| 710: first sealing portion | 720: second sealing portion |
| 730: third sealing portion | 810: first stop washer |
| 820: second stop washer | |

DETAILED DESCRIPTION OF EMBODIMENT

The present invention will now be described in detail with reference to the attached drawings.

Figure 1:
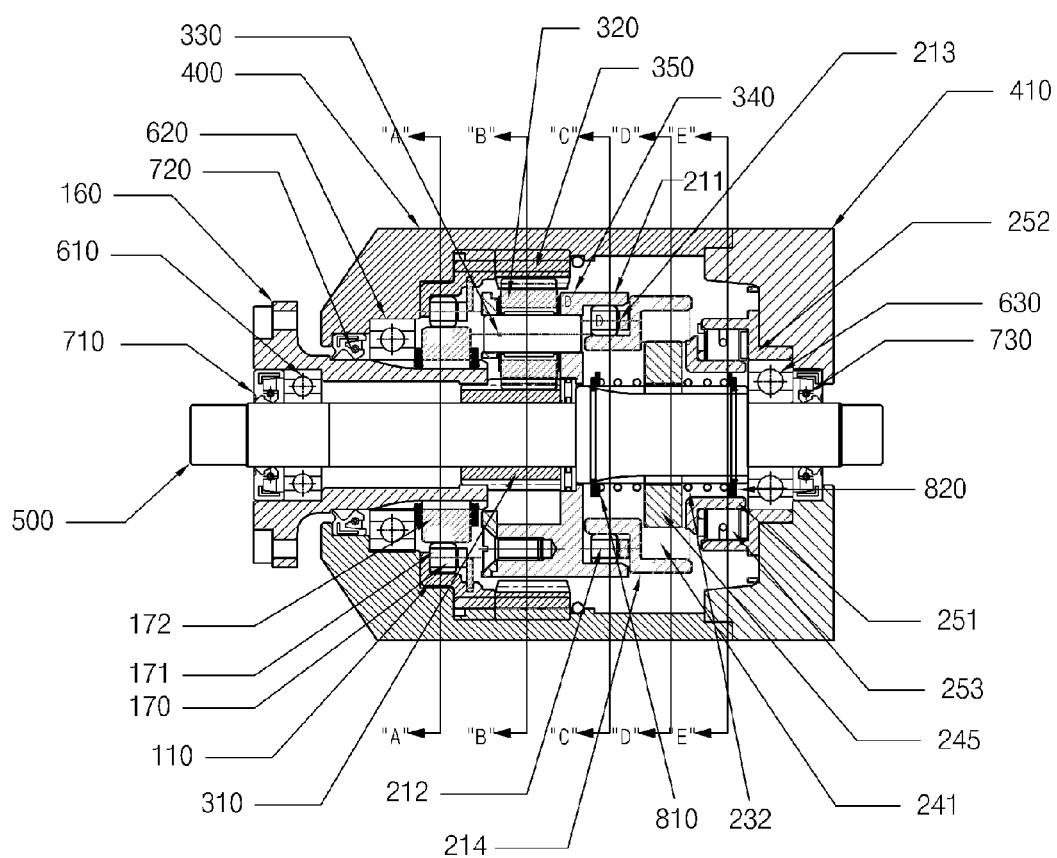
FIG. 1 is a cross-sectional view of an automatic transmission according to a first exemplary embodiment of the present invention.
Figure 2:
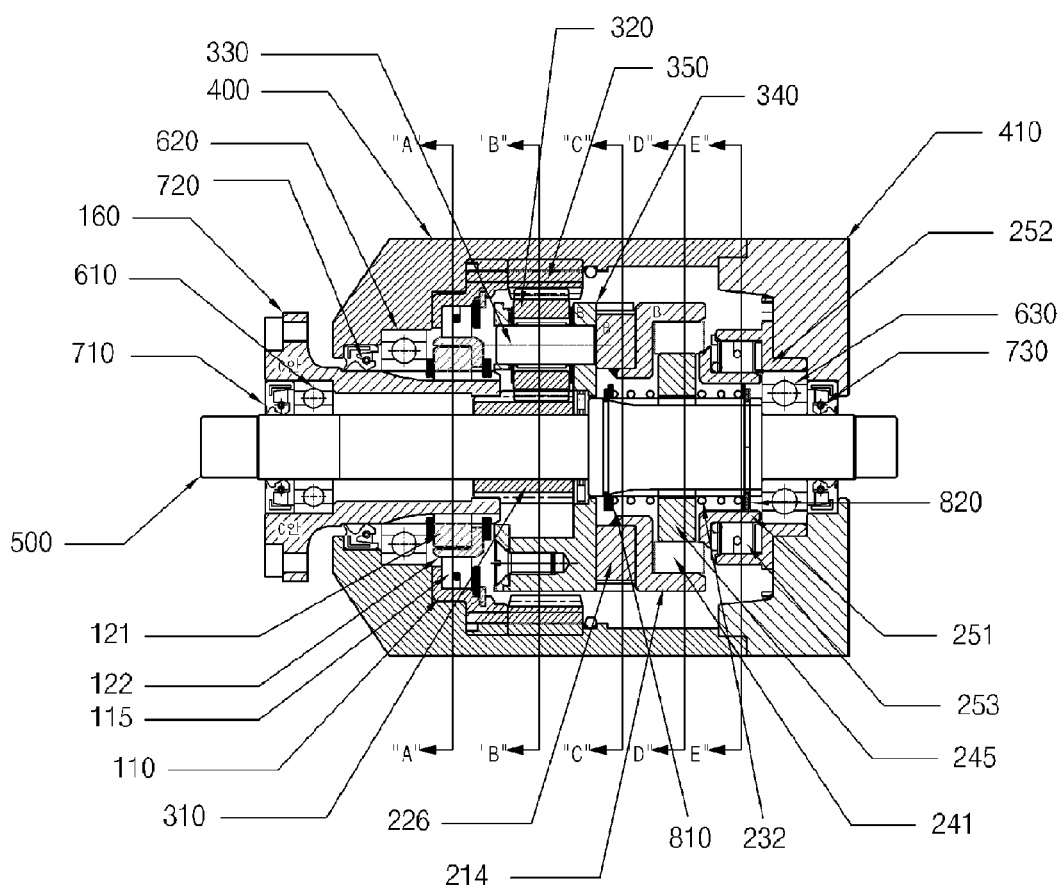
FIG. 2 is a cross-sectional view of an automatic transmission according to a second exemplary embodiment of the present invention.
Figure 3:
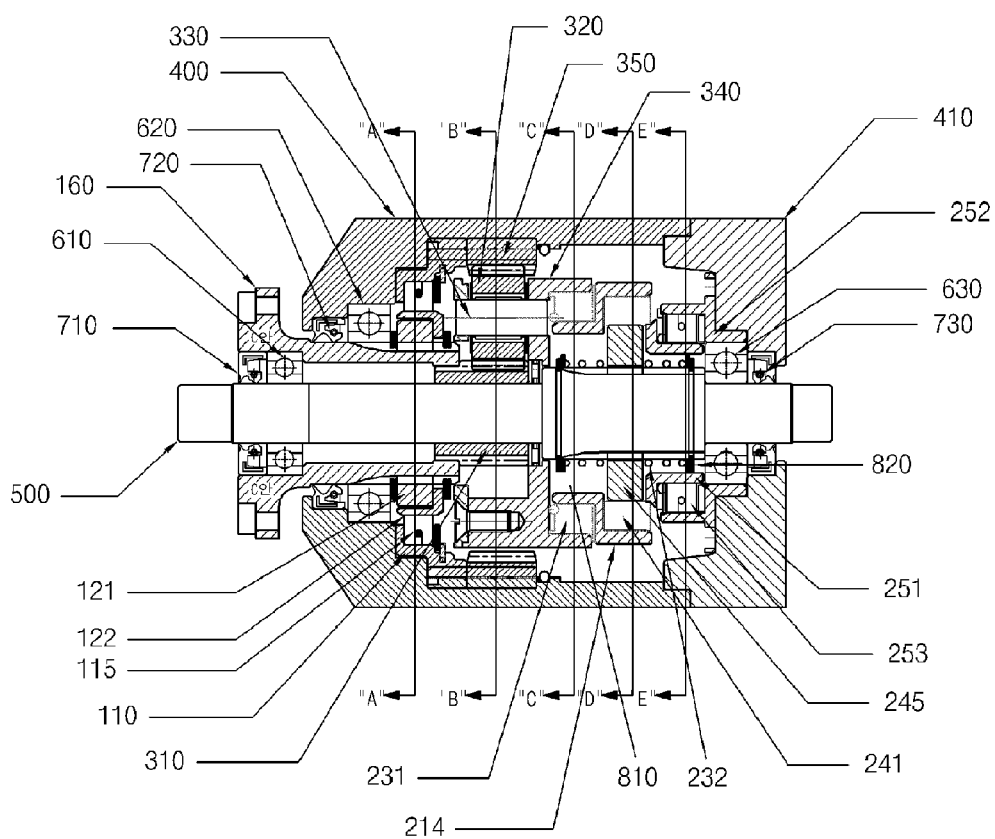
FIG. 3 is a cross-sectional view of an automatic transmission according to a third exemplary embodiment of the present invention.

FIG. 1 is a cross-sectional view of an automatic transmission according to a first exemplary embodiment of the present invention, FIG. 2 is a cross-sectional view of an automatic transmission according to a second exemplary embodiment of the present invention, and FIG. 3 is a cross-sectional view of an automatic transmission according to a third exemplary embodiment of the present invention.

First, the entire configuration of the present invention will be briefly mentioned and thus a detailed configuration and operation principle thereof will be described later.

Also, in the following descriptions, a clockwise direction is defined as a forward direction and a counterclockwise direction is defined as a reverse direction based on the drawings and it will be described.

Also, it will be noted that the present invention includes a first clutch 100 and a second clutch 200. The first clutch 100 includes a first needle clutch illustrated in FIG. 6 and a first buffering clutch 150 illustrated in FIG. 7.

It will be noted that the second clutch 200 includes a first sub-clutch 210, a second sub-clutch 240, and a third sub-clutch 250.

Also, it will be noted in advance that a locking gap of the second sub-clutch 240 may be preferably formed to be smaller than a locking gap of the first clutch 100 and a locking gap of the first sub-clutch 210.

The first sub-clutch 210 may be connected to an opposite side to a satellite gear 320 installed at a planetary gear portion 300 and may confine a carrier 340 to be rotated in the reverse direction.

The second sub-clutch 240 may be connected to the first sub-clutch 210.

One side of the third sub-clutch 250 may be connected to a hub housing 400, and the other side of the third sub-clutch 250 may be connected to the second sub-clutch 240 so that the third sub-clutch 250 may confine reverse rotation of the hub housing 400.

Figure 9:
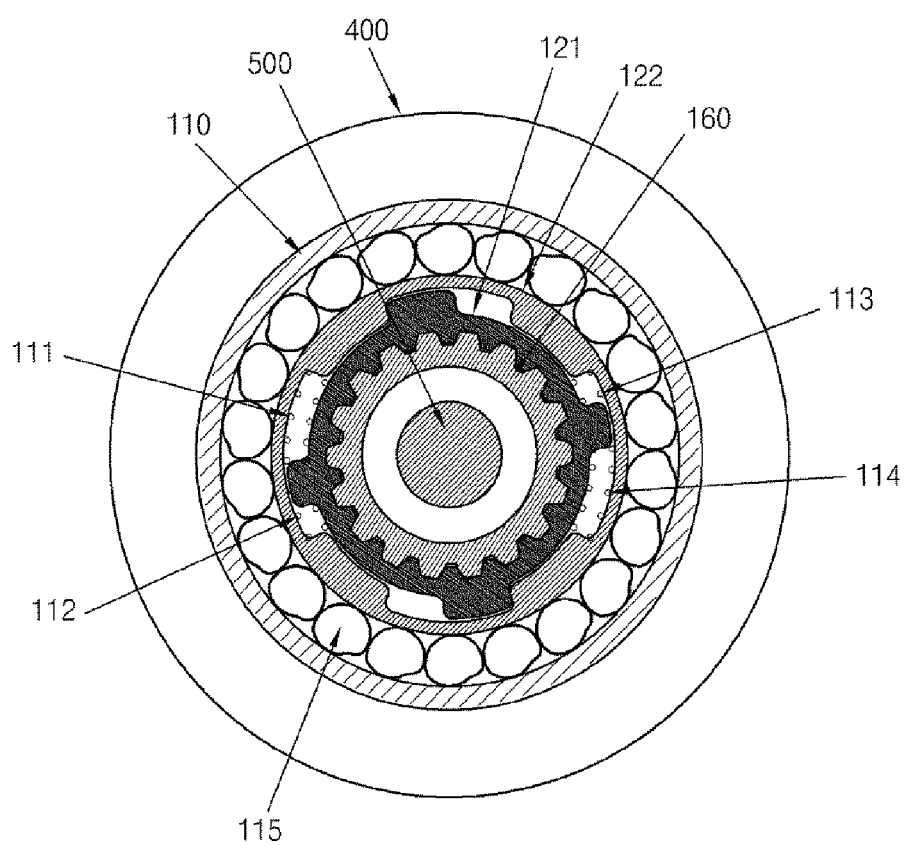
FIG. 9 is a cross-sectional view taken along line A-A when an input shaft is rotated in a reverse direction according to second, third, and fourth exemplary embodiments of the present invention.

It will also be noted that the first sub-clutch 210 includes one of a second needle clutch that is illustrated in FIG. 9, a second buffering clutch illustrated in FIG. 10, and a one way clutch illustrated in FIG. 11, which will be described later.

First, an automatic transmission according to a first exemplary embodiment of the present invention will be described in detail with reference to the attached drawings.

An input shaft 160 is inserted into a fixing shaft 500 and is rotatably installed thereon.

The input shaft 160 is installed at the left side of the automatic transmission, i.e., at a first bearing 610 so as to be smoothly rotated on the fixing shaft 500, and a first sealing portion 710 is installed at the left side of the first bearing 610, i.e., between the fixing shaft 500 and the input shaft 160 and keeps an air-tight state of the fixing shaft 500 and the input shaft 160.

A driving force transferring unit, such as a belt or chain, may be hung on one side of the input shaft 160, and a sun gear 310 is formed on a right outer circumferential surface of the input shaft 160.

A part of the input shaft 160 is inserted into the hub housing 400.

A second sealing portion 720 is installed between a left outer circumferential surface of the input shaft 160 and a left inner circumferential surface of the hub housing 400 and keeps an air-tight state of the input shaft 160 and the hub housing 400.

The second bearing 620 is installed at a right side of the second sealing portion 720, i.e., between the hub housing 400 and the input shaft 160.

A first needle block 172 is fixed to the input shaft 160.

A first clutch block 110 is fitted onto the first needle block 172 and is connected to the hub housing 400.

A first retainer 170 is installed between the first needle block 172 and the first clutch block 110.

A plurality of first needle pins 171 are installed in the first retainer 170.

The first needle clutch includes the first needle block 172 and the first clutch block 110, the first retainer 170, and the first needle pin 171.

Figure 4:
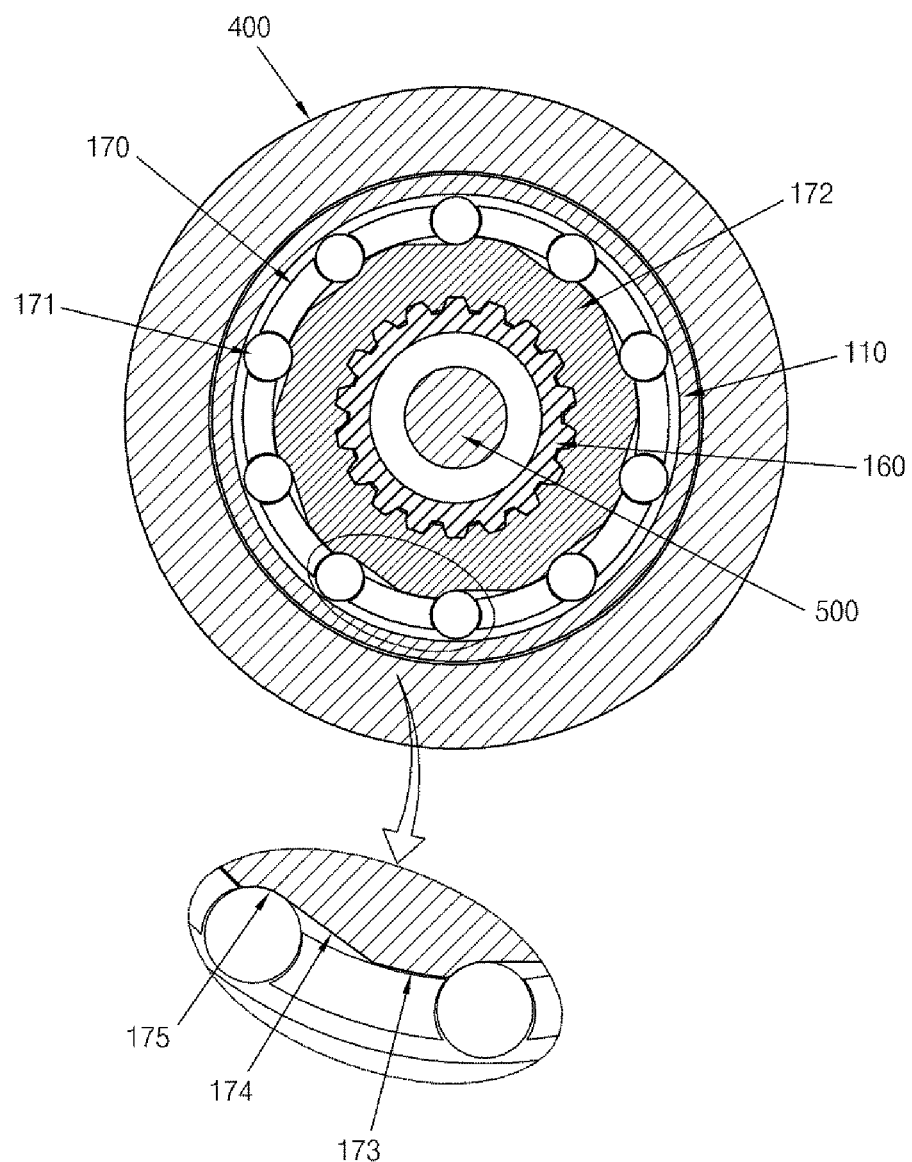
FIG. 4 is a cross-sectional view of a first needle clutch taken along line A-A according to first, fifth, and sixth exemplary embodiments of the present invention.

FIG. 4 is a cross-sectional view of a first needle clutch taken along line A-A according to first, fifth, and sixth exemplary embodiments of the present invention.

Since the first needle block 172 is fitted onto an outer surface of the input shaft 160 and is fixed to the input shaft 160, the first needle block 172 is rotated together with the input shaft 160.

The first clutch block 110 is connected to an inner circumferential surface of the hub housing 400 and is rotated together with the hub housing 400.

The first retainer 170 includes a plurality of first needle pins 171 and is installed between the first needle block 172 and the first clutch block 110.

A first groove 173 is formed in an outer circumferential surface of the first needle block 172 so that the first groove 173 is formed to be close to the first retainer 170.

A second groove 174 slantly extends from the first groove 173, and a third groove 175 extends from the second groove 174, and the first needle pin 171 is accommodated in the third groove 175.

In other words, since the third groove 175 is formed to be concave in a direction of a center of rotation of the first clutch block 110, when the first needle pin 171 is placed in the third groove 175, the first needle pin 171 may freely move between the first clutch block 110 and the first needle block 172.

The first groove 173, the second groove 174, and the third groove 175 are consecutively formed along the outer circumferential surface of the first needle block 172, and the first needle pin 171 is preferably included in each third groove 175.

In other words, a shortest distance from the third groove 175 to the first clutch block 110 is formed to be greater than or equal to a diameter of the first needle pin 171, and a minimum value of a shortest distance from the second groove 174 to the first clutch block 110 is formed to be smaller than the diameter of the first needle pin 171.

When the input shaft 160 is rotated in the reverse direction, the first needle block 172 is rotated in the reverse direction, and all of the first groove 173, the second groove 174, and the third groove 175 are rotated in the reverse direction. Thus, the first needle pin 171 is placed in the third groove 175 and moves freely so that the first needle block 172 and a second clutch block 214 are not confined with respect to each other and thus locking of the first needle clutch is released.

Contrary to this, when the input shaft 160 is rotated in the forward direction, the first needle block 172 is rotated in the forward direction, and all of the first groove 173, the second groove 174, and the third groove 175 are rotated in the forward direction. Thus, the first needle pin 171 leaves the third groove 175 and is gradually in close contact with the first clutch block 110 by the second groove 174 formed to be long.

When the input shaft 160 is continuously rotated in the forward direction, the first needle pin 171 is leaning to a right side of the second groove 174 of FIG. 4 detail view and meets a limitation at which the first needle pin 171 cannot move in a direction of the first groove 173 any more. As a result, the first needle pin 171 is in a locked state in which it is fixed between the first clutch block 110 and the second groove 174.

In other words, when the input shaft 160 is rotated in the forward direction, the first clutch block 110 and the first needle block 172 are locked with respect to each other. Thus, the first clutch block 110 is rotated in the forward direction so that the hub housing 400 is output in the forward direction.

Figure 5:
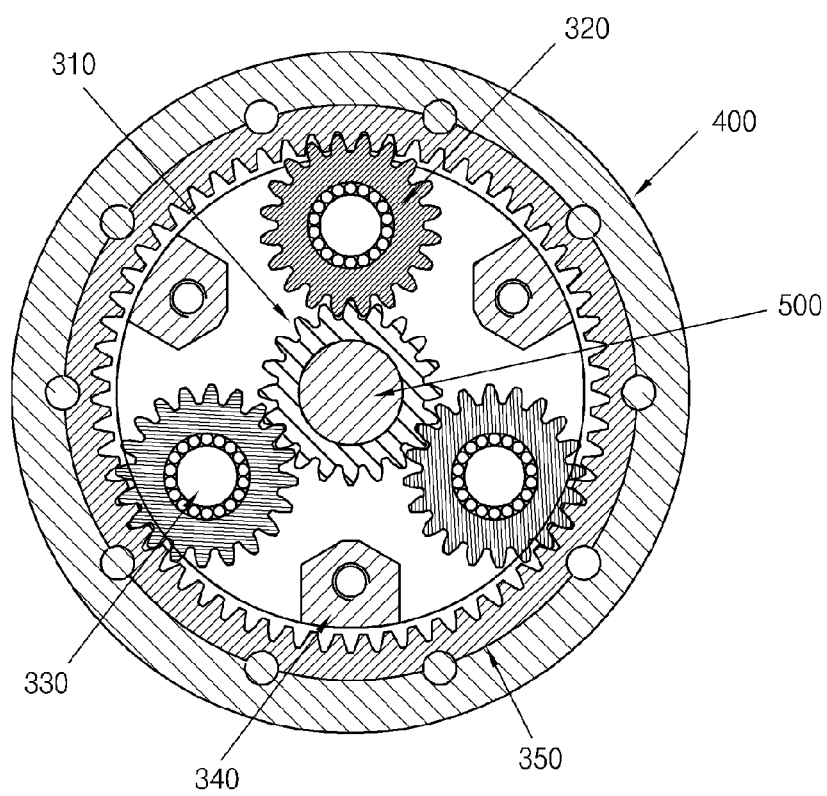
FIG. 5 is a cross-sectional view taken along line B-B of a planetary gear portion according to exemplary embodiments of the present invention.

FIG. 5 is a cross-sectional view taken along line B-B of a planetary gear portion according to exemplary embodiments of the present invention.

The satellite gear 320 is rotatably installed at a carrier pin 330 of the planetary gear portion 300 that is fixed to a carrier 340. The satellite gear 320 is engaged between the sun gear 310 rotated on the fixing shaft 500 and the ring gear 350 fixed to the hub housing 400.

Figure 6:
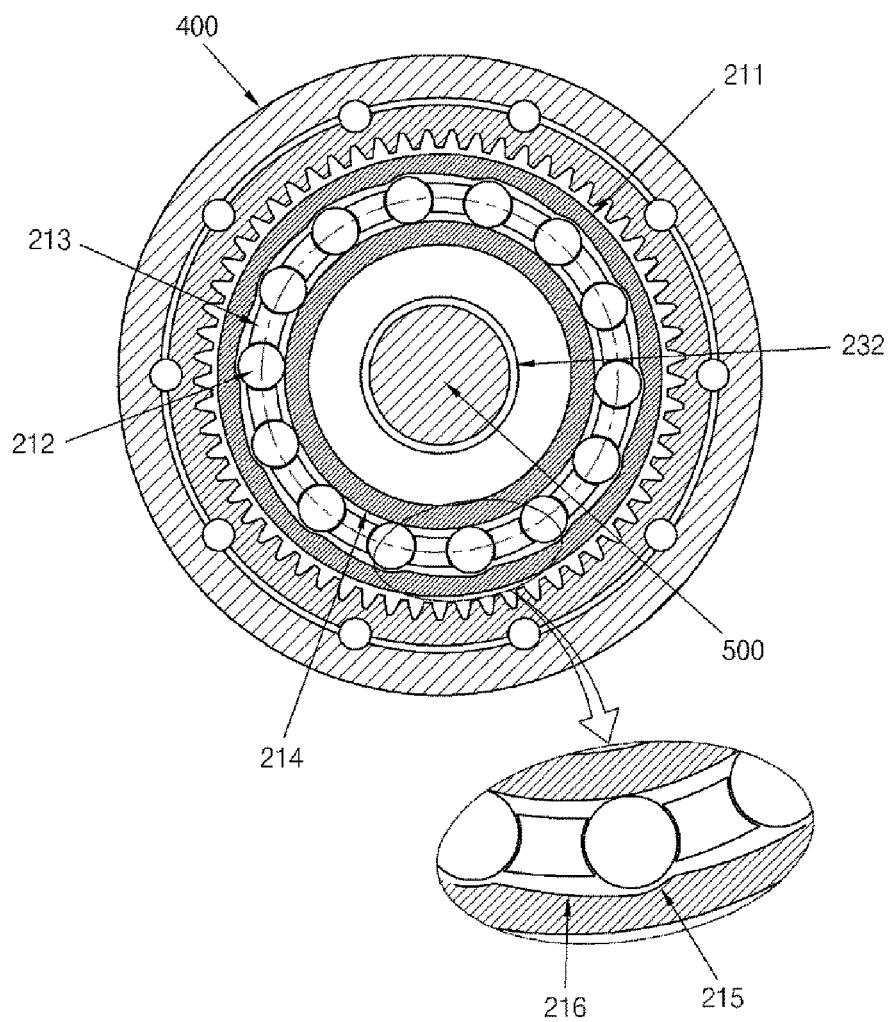
FIG. 6 is a cross-sectional view taken along line C-C according to first and fourth exemplary embodiments of the present invention and is a cross-sectional view of a second needle clutch that is a kind of a first sub-clutch.

FIG. 6 is a cross-sectional view taken along line C-C according to first and fourth exemplary embodiments of the present invention and is a cross-sectional view of a second needle clutch that is a kind of a first sub-clutch.

A second needle block 211 is fitted onto the second clutch block 214 and is formed in a side of the carrier 340.

A second retainer 213 is installed between the second clutch block 214 and the second needle block 211, and a plurality of second needle pins 212 are installed at the second retainer 213.

In more detail, a fourth groove 215 is formed in an inner circumferential surface of the second needle block 211.

The fourth groove 215 is formed to be concave in a direction of the hub housing 400 on inner walls of the second needle block 211 as the fourth groove 215 gets closer to the second retainer 213 in the reverse direction.

A fifth groove 216 is formed to be inclined to be gradually close to a direction of a center of the fixing shaft 500 as the fifth groove 216 extends from the fourth groove 215 and gets closer to the forward direction.

In other words, a shortest distance from the fourth groove 215 to the second clutch block 214 is formed to be greater than or equal to the diameter of the second needle pin 212, and a minimum value of a shortest distance from the fifth groove 216 to the second clutch block 214 is formed to be smaller than the diameter of the second needle pin 212.

Thus, when the first clutch block 110 connected to the hub housing 400 is rotated in the forward direction, the second needle pin 212 leaves the fourth groove 215 and is directed toward the fifth groove 216 based on the same principle as that of the first needle clutch described above.

A length of the second groove 174 may be formed to be greater than that of the fifth groove 216. This is the same principle as that of a configuration in which the locking gap of the first clutch 100 is formed to be greater than the locking gap of the second clutch 200. A detailed operation principle thereof will be described later.

Figure 7:
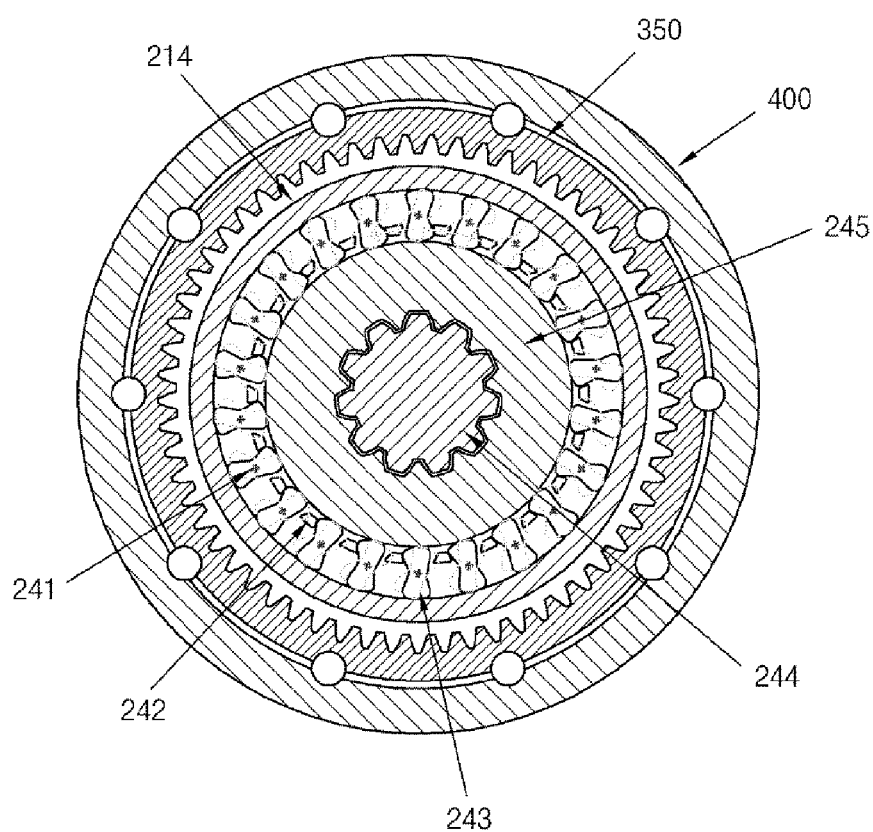
FIG. 7 is a cross-sectional view taken along line D-D according to exemplary embodiments of the present invention and is a cross-sectional view of a second sub-clutch.

FIG. 7 is a cross-sectional view taken along line D-D according to exemplary embodiments of the present invention and is a cross-sectional view of a second sub-clutch.

Since a concentric block 245 is installed on the fixing shaft 500 to have a gap therebetween, the concentric block 245 is installed on the fixing shaft 500 to very slightly move in vertical and horizontal directions based on the drawings.

A stop washer is installed on the fixing shaft 500, and a spring is installed between the concentric block 245 and the stop washer.

In more detail, a first stop washer 810 and a second stop washer 820 are installed on a right side of the fixing shaft 500 inside the hub housing 400, so as to be spaced apart from each other and are fixed to the fixing shaft 500.

The concentric block 245 is installed between the first stop washer 810 and the second stop washer 820, and a concentric spring 232 is installed between the concentric block 245 and the first stop washer 810 and between the concentric block 245 and the second stop washer 820.

The concentric spring 232 serves to maintain a concentric state so that the concentric block 245 may move slightly.

The second clutch block 214 is fitted onto the concentric block 245.

The third retainer 242 is installed between the second clutch block 214 and the concentric block 245.

A plurality of clutch shoes 243 are installed at the third retainer 242.

A third clutch bearing 241 is installed at the plurality of clutch shoes 243 so that the clutch shoes 243 may be rotated.

The third retainer 242 is fixed to the fourth clutch block 251 that will be described later.

A spline portion 244 is fixedly installed onto the fixing shaft 500, and the concentric block 245 is fixed to the spline portion 244.

The third retainer 242 is installed at the clutch shoes 243 between the third clutch bearing 241 and the concentric block 245.

A lengthwise length of each of the clutch shoes 243 may be formed to be equal to or greater than a gap between the concentric block 245 and the second clutch block 214.

Thus, when the third retainer 242 is rotated in the reverse direction, the clutch shoes 243 are inclined in the forward direction based on the third clutch bearing 241, and the clutch shoes 243 slid between the concentric block 245 and the second clutch block 214 and thus, locking of the clutch shoes 243 is released.

Contrary to this, when the third retainer 242 is rotated in the forward direction, the clutch shoes 243 are inclined in the reverse direction based on the third clutch bearing 241, and when the clutch shoes 243 are caught between the concentric block 245 and the second clutch block 214, the second clutch block 214 and the concentric block 245 are locked with respect to each other.

Figure 8:
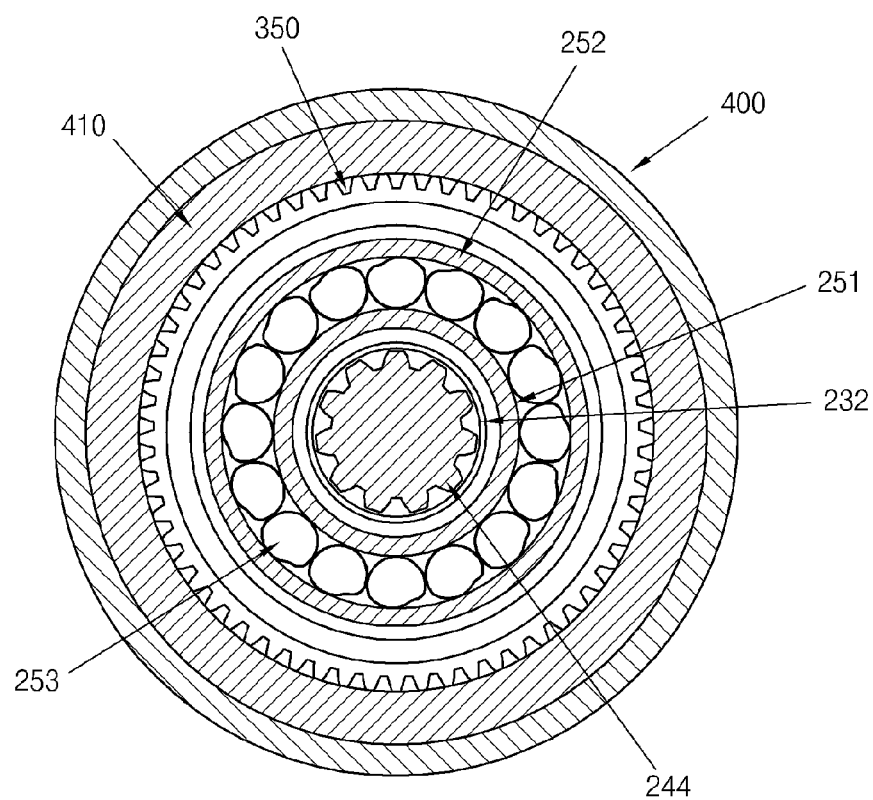
FIG. 8 is a cross-sectional view taken along line E-E according to exemplary embodiments of the present invention and is a cross-sectional view of a third sub-clutch.

FIG. 8 is a cross-sectional view taken along line E-E according to exemplary embodiments of the present invention and is a cross-sectional view of a third sub-clutch.

The fourth clutch block 251 is fitted onto the fixing shaft 500.

The fifth clutch block 252 is fitted onto the fourth clutch block 251 and is fixed to a cover housing 410 installed at the hub housing 400.

The fourth clutch bearing 253 is installed between the fourth clutch block 251 and the fifth clutch block 252.

Since the fifth clutch block 252 is fixed to the cover housing 410, the fifth clutch block 252 is rotated together with the hub housing 400 to which the cover housing 410 is fixed.

A length of a long radius of the fourth clutch bearing 253 is formed to be greater than a gap between the fourth clutch block 251 and the fifth clutch block 252, and a length of the fourth clutch bearing 253 having a small radius is formed to be greater than the gap between the fourth clutch block 251 and the fifth clutch block 252.

Thus, the fifth clutch block 252 is rotated in the forward direction as the hub housing 400 is rotated in the forward direction. Thus, the short radius of the fourth clutch bearing 253 is in contact with the fourth clutch block 251 and the fifth clutch block 252, respectively, and slides and thus locking of the fourth clutch bearing 253 is released.

When locking of the third sub-clutch 250 is released, the hub housing 400 may be continuously rotated in the forward direction.

Contrary to this, the fifth clutch block 252 is rotated in the reverse direction as the hub housing 400 is rotated in the reverse direction. Thus, the long radius of the fourth clutch bearing 253 is in contact with the fourth clutch block 251 and the fifth clutch block 252, respectively, and is caught therein and thus is locked.

When the third sub-clutch 250 is locked, the fourth clutch block 251 is also rotated in the reverse direction when the hub housing 400 is continuously rotated in the reverse direction.

An operation of an automatic transmission according to the first embodiment of the present invention will be described with reference to the above description.

When the input shaft 160 is used as a driving force input portion and is rotated in the forward direction, the first needle block 172 of the first needle clutch is rotated in the forward direction.

As the first needle block 172 is rotated in the forward direction, the first needle pin 171 is locked in the second groove 174, and the first clutch block 110 is rotated in the forward direction.

Since the first clutch block 110 is fixed to the hub housing 400, the hub housing 400 is output in the forward direction by the first clutch block 110 that is rotated in the forward direction.

As the input shaft 160 is rotated in the forward direction, the sun gear 310 is also rotated in the forward direction, and the satellite gear 320 engaged with the sun gear 310 is rotated in the reverse direction.

When the satellite gear 320 is rotated in the forward direction and thus is rotated in the reverse direction along the ring gear 350, the carrier pin 330 revolves around the fixing shaft 500 in the forward direction, and thus, the carrier 340 is rotated in the forward direction.

Since the carrier 340 is connected to the second needle block 211, the second needle pin 212 is placed in the fourth groove 215 formed in the second needle block 211 as the carrier 340 is rotated in the forward direction. Thus, the second needle clutch is released, as mentioned above.

As a result, locking of the second clutch 200 is released when the input shaft 160 is rotated in the forward direction.

Thus, the hub housing 400 may be continuously driven in the forward direction as the input shaft 160 is rotated in the forward direction.

When the input shaft 160 is used as the driving force input portion and is rotated in the reverse direction, the first needle block 172 of the first needle clutch is rotated in the reverse direction.

As the first needle block 172 is rotated in the reverse direction, the first needle pin 171 is placed in the third groove 175 and locking of the first needle pin 171 is released so that power is not transferred to the first clutch block 110.

As the input shaft 160 is rotated in the reverse direction, the sun gear 310 is also rotated in the reverse direction, and the satellite gear 320 engaged with the sun gear 310 is rotated in the forward direction.

When the satellite gear 320 is rotated in the forward direction and is rotated in the reverse direction along the ring gear 350, the carrier pin 330 starts reverse revolution around the fixing shaft 500, and as such, the carrier 340 is rotated in the reverse direction.

Since the carrier 340 is connected to the second needle block 211, as the carrier 340 is rotated in the reverse direction, the second needle pin 212 is caught in the fifth groove 216 formed in the second needle block 211. Thus, the second needle clutch is locked, as mentioned above.

As a result, when the input shaft 160 is rotated in the reverse direction, the second clutch 200 is locked in the reverse direction.

As the carrier 340 is locked in the reverse direction, the carrier 340 is fixed to fixing shaft 500 by concentric block 245 with second clutch block 214, and the satellite gear 320 is rotated in the forward direction. Thus, the ring gear 350 is decelerated and is rotated in the forward direction.

Thus, as the input shaft 160 is rotated in the reverse direction, the hub housing 400 is decelerated and may be driven in the forward direction.

Next, in first through sixth exemplary embodiments of the present invention, an operation of the hub housing 400 when the hub housing 400 is used as an input portion and is driven in the forward direction, will be described below.

When the hub housing 400 is used as the driving force input portion and is rotated in the forward direction, the cover housing 410 fixed to the hub housing 400 is rotated in the forward direction.

Since the fifth clutch block 252 is fixed to the cover housing 410, the fifth clutch block 252 is also rotated in the forward direction when the cover housing 410 is rotated in the forward direction.

A length of a long radius of the fourth clutch bearing 253 is formed to be greater than the gap between the fourth clutch block 251 and the fifth clutch block 252, and a length of a short radius of the fourth clutch bearing 253 is formed to be greater than the gap between the fourth clutch block 251 and the fifth clutch block 252.

Thus, when the fifth clutch block 252 is rotated in the forward direction as the hub housing 400 is rotated in the forward direction, the short radius of the fourth clutch bearing 253 is in contact with the fourth clutch block 251 and the fifth clutch block 252, respectively, and slides and thus, locking of the fourth clutch bearing 253 is released.

In other words, when locking of the third sub-clutch 250 that is a kind of the second clutch 200 is released, the hub housing 400 may be continuously rotated in the forward direction.

As the hub housing 400 is rotated in the forward direction, a distance between a driving shaft and the first clutch block 110 of the first needle clutch installed on inner walls of the hub housing 400 is formed to be uniform, and no groove is formed in the first clutch block 110. Thus, power is not transferred to the first needle block 172 so that the hub housing 400 may be continuously rotated in the forward direction.

Next, in first through sixth exemplary embodiments of the present invention, a moving-backward operation of the hub housing 400 when the hub housing 400 is used as an input portion and is driven in the reverse direction, will be described below.

When the hub housing 400 is used as a driving force input portion and is rotated in the reverse direction, the cover housing 410 fixed to the hub housing 400 is rotated in the reverse direction.

Since fifth clutch block 252 is fixed to the cover housing 410, the fifth clutch block 252 is also rotated in the reverse direction when the cover housing 410 is rotated in the reverse direction.

A length of a long radius of the fourth clutch bearing 253 is formed to be greater than the gap between the fourth clutch block 251 and the fifth clutch block 252, and a length of a short radius of the fourth clutch bearing 253 is formed to be greater than the gap between the fourth clutch block 251 and the fifth clutch block 252.

Thus, when the hub housing 400 is rotated in the reverse direction and the fifth clutch block 252 is rotated in the reverse direction, the long radius of the fourth clutch bearing 253 is in contact with the fourth clutch block 251 and the fifth clutch block 252, respectively, and is locked.

Since the fourth clutch block 251 is connected to the third retainer 242, when the fourth clutch block 251 is rotated in the reverse direction, and the third retainer 242 is rotated in the reverse direction.

When the third retainer 242 is rotated in the reverse direction, the clutch shoes 243 are inclined in the forward direction based on the third clutch bearing 241. As a result, the clutch shoes 243 slid between the concentric block 245 and the second clutch block 214 and thus, locking of the clutch shoes 243 is released.

In other words, since the second sub-clutch 240 that is a kind of the second clutch 200 is released, the moving-backward operation of the hub housing 400 may be performed.

In more detail, the locking gap of the first clutch 100 and the locking gap of the first sub-clutch 210 are formed to be greater than that of the second sub-clutch 240.

Thus, when the hub housing 400 is rotated in the reverse direction, locking of the second sub-clutch 240 linked to the third sub-clutch 250 is released prior to the first clutch 100 so that the moving-backward operation of the hub housing 400 may be performed.

In this case, it is noted that the first sub-clutch 210 may include the second needle clutch, the second buffering clutch, or the one way clutch, as mentioned above.

Also, in the first exemplary embodiment of the present invention, a distance between the driving shaft and the first clutch block 110 of the first needle clutch installed on the inner walls of the hub housing 400 is formed to be uniform, and no groove is formed in the first clutch block 110 and thus, power is not transferred to the first needle block 172.

In this case, since the clutch shoes 243 of the second sub-clutch 240 are released prior to the first clutch 100, the hub housing 400 may be rotated in the reverse direction regardless of the first clutch 100 so that the moving-backward operation of the hub housing 400 may be performed.

The locking gap of the first clutch 100 that is greater than the locking gap of the second clutch 200 will be described in more detail below.

When the hub housing 400 is rotated in the reverse direction, the ring gear 350 is also rotated in the reverse direction, and the satellite gear 320 engaged with the ring gear 350 is also rotated in the reverse direction.

When the satellite gear 320 is rotated in the reverse direction, the carrier 340 is rotated in the reverse direction.

When the carrier 340 is rotated in the reverse direction, the second needle clutch is locked, as mentioned above. Thus, at some time, the carrier 340 is not rotated in the reverse direction any more and is locked.

When the carrier 340 is locked, the sun gear 310 engaged with the satellite gear 320 that is rotated in the reverse direction is rotated in the forward direction.

When the sun gear 310 is rotated in the forward direction, as mentioned above, the first needle clutch that is a kind of the first clutch 100 is locked, and the hub housing 400 is driven in the forward direction.

As a result, the hub housing 400 is used as an input portion and transfers a reverse driving force and the carrier 340 is locked, the input shaft 160 to be output is output in the forward direction, and the hub housing 400 is rotated in the forward direction. Thus, contradiction in which driving forces in opposite directions collide with each other, occurs so that the moving-backward operation of the hub housing 400 may not be performed.

Thus, when the second clutch 200 is released before the first clutch 100 is locked, contradiction of driving force collision is solved, and the moving-backward operation of the hub housing 400 may be performed.

Next, the second exemplary embodiment of the present invention will be described with reference to the attached drawings.

FIG. 2 is a cross-sectional view of an automatic transmission according to a second exemplary embodiment of the present invention.

Figure 10:
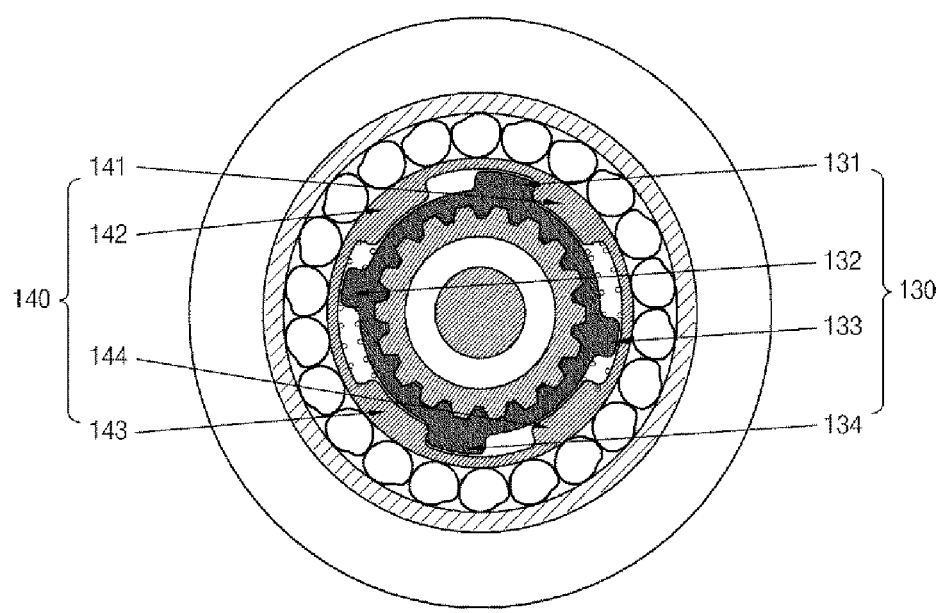
FIG. 10 is a cross-sectional view taken along line A-A when an input shaft is rotated in a forward direction according to second, third, and fourth exemplary embodiments of the present invention.

FIG. 9 is a cross-sectional view taken along line A-A when an input shaft is rotated in a reverse direction according to second, third, and fourth exemplary embodiments of the present invention, and FIG. 10 is a cross-sectional view taken along line A-A when an input shaft is rotated in a forward direction according to second, third, and fourth exemplary embodiments of the present invention.

The input shaft 160 is inserted into the fixing shaft 500 and is rotatably installed thereon.

The input shaft 160 is installed at the left side of the automatic transmission, i.e., at the first bearing 610 so as to be smoothly rotated on the fixing shaft 500, and the first sealing portion 710 is installed at the left side of the first bearing 610, i.e., between the fixing shaft 500 and the input shaft 160 and keeps an air-tight state of the fixing shaft 500 and the input shaft 160.

A driving force transferring unit, such as a belt or chain, may be hung on one side of the input shaft 160, and the sun gear 310 is formed on a right outer circumferential surface of the input shaft 160.

A part of the input shaft 160 is inserted into the hub housing 400.

The second sealing portion 720 is installed between the left outer circumferential surface of the input shaft 160 and the left inner circumferential surface of the hub housing 400 and keeps an air-tight state of the input shaft 160 and the hub housing 400.

The second bearing 620 is installed at the right side of the second sealing portion 720, i.e., between the hub housing 400 and the input shaft 160.

A first male buffering block 121 is fixed to the outer circumferential surface of the input shaft 160, and the first clutch block 110 is fixed to the inner circumferential surface of the hub housing 400.

A first female buffering block 122 accommodates the first male buffering block 121, and the first clutch bearing 115 is installed between the first female buffering block 122 and the first clutch block 110.

The first clutch 100 includes the first male buffering block 121 and the first female buffering block 122, a spring, the first clutch block 110, and the first buffering clutch 150 including the first clutch bearing 115.

In other words, the first male buffering block 121 has first protrusion portions 130 and is fixed to the input shaft 160.

The first female buffering block 122 is connected to the first male buffering block 121 in a state in which first hanging jaws 140 on which each of the first protrusion portions 130 is hung, are formed on the first female buffering block 122.

The spring is installed between one of the first protrusion portions 130 and one of the first hanging jaws 140.

The first clutch block 110 is fixed to the hub housing 400 and is fitted onto the first female buffering block 122.

The first clutch bearing 115 is installed between the first female buffering block 122 and the first clutch block 110.

In more detail, the first male buffering block 121 is fixed to the input shaft 160, and the first protrusion portions 130 are formed on an outer circumferential surface of the first male buffering block 121.

Each of the first protrusion portions 130 has a first protrusion 131, a fourth protrusion 134 formed at an opposite side to that of the first protrusion 131, a second protrusion 132 formed at the left side of the first protrusion 131, and a third protrusion 133 formed at an opposite side to that of the second protrusion 132.

A fifth protrusion 141 on which the first protrusion 131 is hung when the first protrusion 131 is rotated in the forward direction, a seventh protrusion 143 on which the fourth protrusion 134 is hung when the fourth protrusion 134 is rotated in the reverse direction, a sixth protrusion 142 that is close to the second protrusion 132 when the second protrusion 132 is rotated in the forward direction, and an eighth protrusion 144 that is close to the third protrusion 133 when the third protrusion 133 is rotated in the forward direction, are formed on an inner circumferential surface of the first female buffering block 122.

A first spring 111 is installed between the second protrusion 132 and the sixth protrusion 142, and a second spring 112 is installed between the second protrusion 132 and the seventh protrusion 143, and a third spring 113 is installed between the third protrusion 133 and the fifth protrusion 141, and a fourth spring 114 is installed between the third protrusion 133 and the eighth protrusion 144 so that rotation of the first male buffering block 121 is delayed for a predetermined time.

Next, an operation of the first clutch 100 according to second, third, and fourth exemplary embodiments of the present invention will be described.

The input shaft 160 is gradually rotated in the forward direction while the second protrusion 132 of the first protrusion portion 130 overcomes an elasticity of the first spring 111 and the third protrusion 133 of the first protrusion portion 130 overcomes an elasticity of the fourth spring 114.

After a predetermined time elapses, the first protrusion 131 is hung on the fifth protrusion 141 of a first hanging portion, and the fourth protrusion 134 is hung on the seventh protrusion 143 so that a forward driving force of the input shaft 160 is transferred to the first female buffering block 122.

The first clutch bearing 115 is installed between the outer circumferential surface of the first female buffering block 122 and the first clutch block 110.

A length of a long radius of the first clutch bearing 115 is formed to be greater than a gap between the first female buffering block 122 and the first clutch block 110, and a length of a short radius of the first clutch bearing 115 is formed to be greater than the gap between the first female buffering block 122 and the first clutch block 110.

Thus, when the input shaft 160 is rotated in the forward direction and the first male buffering block 121 is rotated in the forward direction, the long radius of the first clutch bearing 115 is in contact with the first female buffering block 122 and the first clutch block 110, respectively, and is locked.

The input shaft 160 is gradually rotated in the reverse direction while the second protrusion 132 of the first protrusion portion 130 overcomes the elasticity of the second spring 112 and the third protrusion 133 of the first protrusion portion 130 overcomes the elasticity of the third spring 113.

As a result, after a predetermined time elapses, the first protrusion 131 is hung on the sixth protrusion 142 of the first hanging jaw 140, and the fourth protrusion 134 is hung on the eighth protrusion 144 so that a reverse driving force of the input shaft 160 is transferred to the first female buffering block 122.

When the input shaft 160 is rotated in the reverse direction and the first male buffering block 121 is rotated in the reverse direction, the short radius of the first clutch bearing 115 is in contact with the first female buffering block 122 and the first clutch block 110, respectively, and or is spaced apart therefrom, and thus, locking of the first clutch bearing 115 is released.

Figure 11:
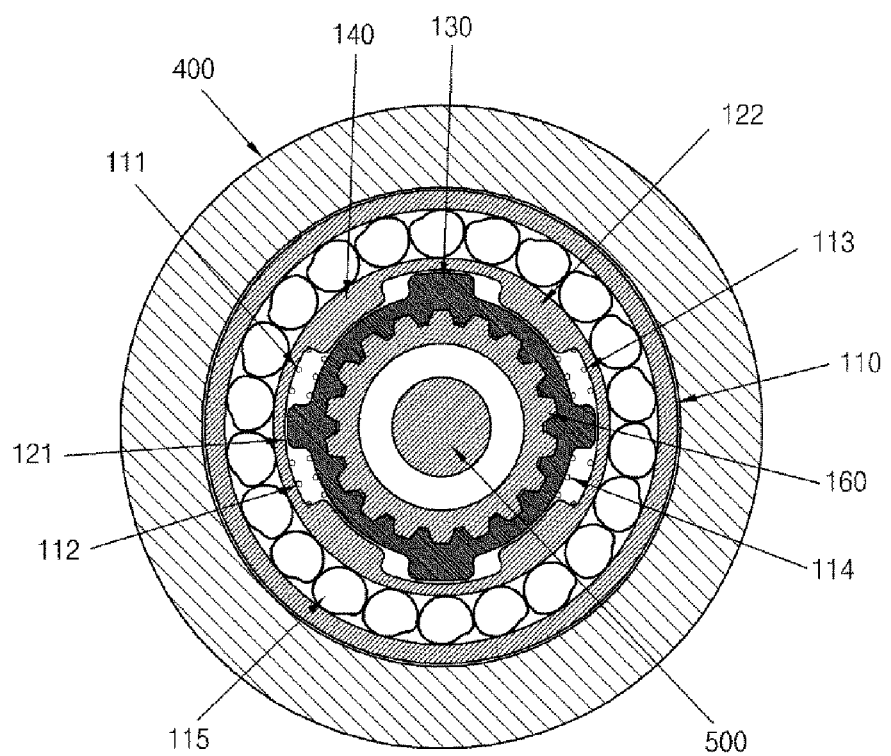
FIG. 11 is a cross-sectional view taken along line A-A according to second, third, and fourth exemplary embodiments of the present invention when a driving force is not transferred to the input shaft.

FIG. 11 is a cross-sectional view taken along line A-A according to second, third, and fourth exemplary embodiments of the present invention and is a cross-sectional view when a driving force is not transferred to the input shaft.

Since the driving force is not transferred to the input shaft 160, the first hanging jaw 140 and the first hanging portion are spaced apart from each other.

This is because the first spring 111 and the second spring 112 provide the same elastic force at both sides of the second protrusion 132 and the third spring 113 and the fourth spring 114 provide the same elastic force to both sides of the third protrusion 133.

Figure 12:
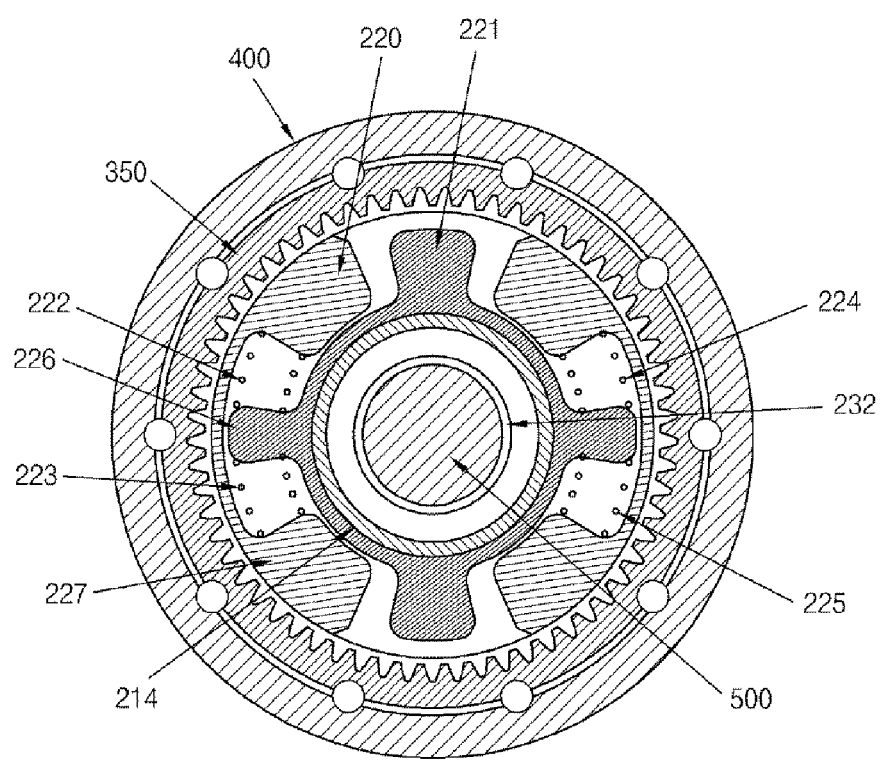
FIG. 12 is a cross-sectional view taken along line C-C according to second and fifth exemplary embodiments of the present invention and is a cross-sectional view of a second buffering clutch that is a kind of a first sub-clutch.

FIG. 12 is a cross-sectional view taken along line C-C according to second and fifth exemplary embodiments of the present invention and is a cross-sectional view of a second buffering clutch that is a kind of the first sub-clutch 210.

The second clutch 200 includes a second buffering clutch including a second male buffering block 226, a second female buffering block 227, and a spring.

The second male buffering block 226 has second protrusion portions 221 and is connected to the clutch block 214 as illustrated in FIGS. 2 and 12.

The second female buffering block 227 is fixed to the carrier 340 and is connected to the second male buffering block 226 in a state in which second hanging jaws 220 on which each of the second protrusion portions 221 is hung, are formed.

The spring is installed between one of the second protrusion portions 221 and one of the second hanging jaws 220.

In more detail, the spring includes a fifth spring 222 and a sixth spring 223 and a seventh spring 224 and an eighth spring 225. The springs are disposed based on the same principle as that of the first through fourth springs mentioned above, as illustrated in FIG. 12.

If the hub housing 400 is used as an input portion and is rotated in the forward direction, the second buffering clutch operates based on the same principle mentioned above, in which the first buffering clutch 150 is rotated in the forward direction while the second male buffering block 226 is rotated in the forward direction.

Similarly, if the hub housing 400 is used as the input portion and is rotated in the reverse direction, the second buffering clutch operates based on the same principle mentioned above, in which the first buffering clutch 150 is rotated in the reverse direction while the second male buffering block 226 is rotated in the reverse direction.

In this case, a maximum gap distance between the first hanging jaw 140 and the first protrusion portion 130 is greater than a maximum separation distance between the second hanging jaw 220 and the second protrusion portion 221.

That is, the locking gap of the first clutch 100 is formed to be greater than the locking gap of the second clutch 200.

Next, a third exemplary embodiment of the present invention will be described with reference to the attached drawings.

FIG. 3 is a cross-sectional view of an automatic transmission according to a third exemplary embodiment of the present invention.

An input shaft 160 is inserted into a fixing shaft 500 and is rotatably installed thereon.

The input shaft 160 is installed at the left side of the automatic transmission, i.e., at a first bearing 610 so as to be smoothly rotated on the fixing shaft 500, and a first sealing portion 710 is installed at the left side of the first bearing 610, i.e., between the fixing shaft 500 and the input shaft 160 and keeps an air-tight state of the fixing shaft 500 and the input shaft 160.

A driving force transferring unit, such as a belt or chain, may be hung on one side of the input shaft 160, and a sun gear 310 is formed on a right outer circumferential surface of the input shaft 160.

A part of the input shaft 160 is inserted into the hub housing 400.

A second sealing portion 720 is installed between a left outer circumferential surface of the input shaft 160 and a left inner circumferential surface of the hub housing 400 and keeps an air-tight state of the input shaft 160 and the hub housing 400.

The second bearing 620 is installed at a right side of the second sealing portion 720, i.e., between the hub housing 400 and the input shaft 160.

A first male buffering block 121 is fixed to the outer circumferential surface of the input shaft 160, and the first clutch block 110 is fixed to the inner circumferential surface of the hub housing 400.

A first female buffering block 122 accommodates the first male buffering block 121, and the first clutch bearing 115 is installed between the first female buffering block 122 and the first clutch block 110.

Figure 13:
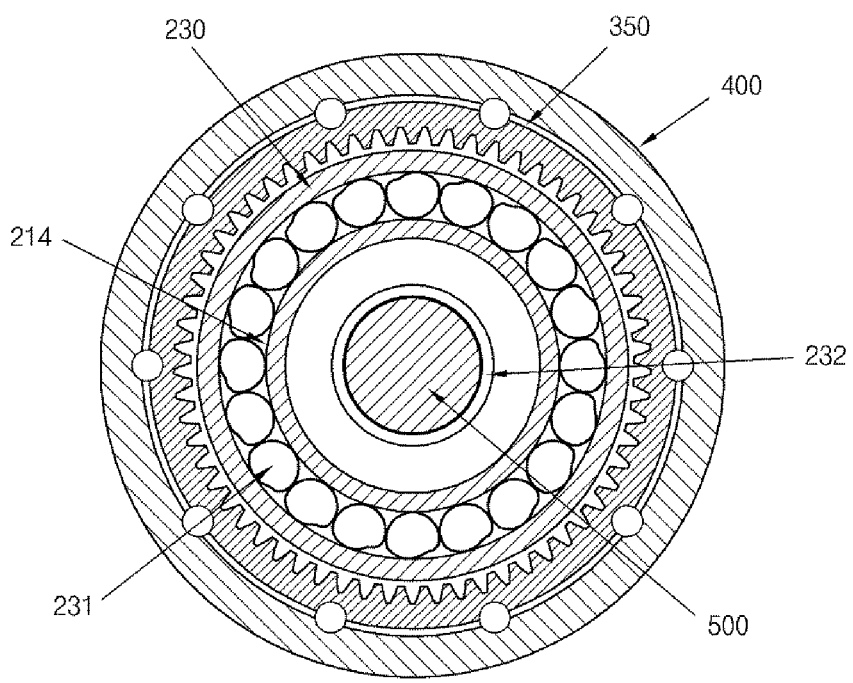
FIG. 13 is a cross-sectional view taken along line C-C according to third and sixth exemplary embodiments of the present invention and is a cross-sectional view of a one way clutch that is a kind of a first sub-clutch.

FIG. 13 is a cross-sectional view taken along line C-C according to third and sixth exemplary embodiments of the present invention and is a cross-sectional view of a one way clutch that is a kind of the first sub-clutch 210.

The second clutch 200 includes a second clutch block 214, a third clutch block 230, and a second clutch bearing 231.

The fixing shaft 500 is inserted into the second clutch block 214, wherein the gap exists between fixing shaft 500 and the second clutch block 214.

The third clutch block 230 is fitted onto the second clutch block 214 and is fixed to the carrier 340.

The second clutch bearing 231 is installed between the second clutch block 214 and the third clutch block 230.

A length of a long radius of the second clutch bearing 231 is formed to be greater than a gap between the second clutch block 214 and the third clutch block 230, and a length of a short radius of the second clutch bearing 231 is formed to be greater than the gap between the second clutch block 214 and the third clutch block 230.

Thus, when the carrier 340 is rotated in the reverse direction, the third clutch block 230 to which the carrier 340 is fixed, is rotated in the reverse direction.

If the third clutch block 230 is rotated in the reverse direction, the long radius of the second clutch bearing 231 is in contact with the third clutch block 230 and the second clutch block 214, respectively, and is locked.

The cover housing 410 is installed on a right end of the hub housing 400.

The cover housing 410 is inserted onto the fixing shaft 500 in a state in which the fifth clutch block 252 is installed in the cover housing 410.

Since the third bearing 630 is installed between the fifth clutch block 252 and the fixing shaft 500, the cover housing 410 causes the hub housing 400 to be rotated.

A third sealing portion 730 is installed on a right end of the third bearing 630 of the cover housing 410 and keeps an air-tight state between the cover housing 410 and the hub housing 400.

Since a fluid is filled in the hub housing 400 so that an operation of the hub housing 400 may be smoothly performed, the first sealing portion 710, the second sealing portion 720, and the third sealing portion 730 keep the air-tight state between the cover housing 410 and the hub housing 400.

Last, it will be noted that a combination of the exemplary embodiments of the present invention is as below.

In the first exemplary embodiment of the present invention, the first clutch 100 is the above-mentioned first needle clutch, and the first sub-clutch 210 may be configured by the above-mentioned second needle clutch.

In the second exemplary embodiment of the present invention, the first clutch 100 is the above-mentioned first buffering clutch 150, and the first sub-clutch 210 may be configured by the second buffering clutch.

In the third exemplary embodiment of the present invention, the first clutch 100 is the above-mentioned first buffering clutch 150, and the first sub-clutch 210 may be configured by the above-mentioned one way clutch.

In the fourth exemplary embodiment of the present invention, the first clutch 100 is the above-mentioned first buffering clutch 150, and the first sub-clutch 210 may be configured by the above-mentioned second needle clutch.

In the fifth exemplary embodiment of the present invention, the first clutch 100 is the above-mentioned first needle clutch, and the first sub-clutch 210 may be configured by the above-mentioned second buffering clutch.

In the sixth exemplary embodiment of the present invention, the first clutch 100 is the above-mentioned needle clutch, and the first sub-clutch 210 may be configured by the above-mentioned one way clutch.

The automatic transmission of the present invention may be applied to various vehicles, such as motor cycles, vehicles, bicycles, two-wheeled motor cycles, three-wheeled motor cycles, and four-wheeled motor vehicles.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An automatic transmission comprising:
    an input shaft that is rotatably installed on a fixing shaft;
    a hub housing into which the input shaft is inserted;
    a first clutch, of which one side is installed on the input shaft and the other side is installed at the hub housing;
    a planetary gear portion comprising a carrier having a satellite gear that is engaged between a ring gear formed on inner walls of the hub housing and a sun gear formed on the input shaft; and
    a second clutch, of which one side is installed on the planetary gear portion and the other side is installed on the hub housing,
    wherein the first clutch and the second clutch include one-direction clutches that are locked in opposite directions, and
    wherein, when the input shaft is rotated in a forward direction, the first clutch is locked, and the second clutch is released so that the hub housing is output in the forward direction, and
    when the input shaft is rotated in the reverse direction, the first clutch is released, and the second clutch is locked so that the ring gear is rotated in the forward direction due to the satellite gear of the planetary gear portion that is rotated in the forward direction, a rotating speed of the hub housing is reduced, and the hub housing is output in the forward direction, and
    when the hub housing is rotated in the forward direction, the second clutch is released, and
    a locking gap of the first clutch is formed to be greater than a locking gap of the second clutch, and
    when the hub housing is rotated in the reverse direction, the sun gear is rotated in the forward direction, the second clutch is first released before the first clutch is locked, so that the hub housing is rotated in the reverse direction and is capable of moving backward.

2. The automatic transmission of claim 1, wherein the second clutch comprises:
    a first sub-clutch that is connected to an opposite side of the satellite gear installed at the planetary gear portion and confines rotation of the carrier in the reverse direction;
    a second sub-clutch is connected to and installed at the first sub-clutch;
    a third sub-clutch connected to a cover housing and configured to confine rotation of the hub housing in the reverse direction, wherein one side of the third sub-clutch is installed at the hub housing and the other side of the third sub-clutch is connected to the second sub-clutch,
    when the hub housing is rotated in the reverse direction, locking of the second sub-clutch linked to the third sub-clutch is released prior to the first clutch and the first sub-clutch.

3. The automatic transmission of claim 2, wherein the second sub-clutch comprises:
    a concentric block installed on the fixing shaft with a gap; and
    a concentric spring installed between a stop washer installed on the fixing shaft and the concentric block.

4. The automatic transmission of claim 3, wherein the second sub-clutch comprises:
    a second clutch block fitted onto the concentric block;
    a third retainer installed between the second clutch block and the concentric block; and
    a clutch shoe installed at the third retainer, and
    the third retainer is fixed to the fourth clutch block.

5. The automatic transmission of claim 2, wherein the third sub-clutch comprises:
    a fourth clutch block fitted onto the fixing shaft;
    a fifth clutch block fitted onto the fourth clutch block and fixed to the cover housing installed at the hub housing; and
    a fourth clutch bearing installed between the fourth clutch block and the fifth clutch block.

6. The automatic transmission of claim 5, wherein the first needle block comprises:
    a first groove that is close to the first retainer;
    a second groove that slantly extends from the first groove; and
    a third groove that extends from the second groove and accommodates the first needle pin, and
    a second needle block comprises:
    a fourth groove that is close to the second retainer; and
    a fifth groove that slantly extends from the fourth groove, and
    a length of the second groove is greater than a length of the fifth groove.

7. The automatic transmission of claim 5, wherein the second sub-clutch comprises:
    a second clutch block fitted onto the concentric block;
    a third retainer installed between the second clutch block and the concentric block; and
    a clutch shoe installed at the third retainer, and
    the third retainer is fixed to the fourth clutch block.

8. The automatic transmission of claim 1, wherein the first clutch comprises:

a first male buffering block having first protrusion portions and fixed to the input shaft;
a first female buffering block connected to the first male buffering block and including first hanging jaws in a state in which the first protrusion portions are hung on the first hanging jaws;
a spring installed between one of the first protrusion portions and one of the first hanging jaws;
a first clutch block, of which one side is fixed to the hub housing and which is fitted onto the first female buffering block; and
a first buffering clutch including a first clutch bearing installed between the first female buffering block and the first clutch block.

9. The automatic transmission of claim 1, wherein the first clutch comprises:
a first needle block fixed to the input shaft;
a first clutch block fitted onto the first needle block and connected to the hub housing;
a first retainer installed between the first needle block and the first clutch block; and
a first needle clutch including a plurality of first needle pins installed at the first retainer.

10. The automatic transmission of claim 1, wherein the second clutch comprises:
a second needle block fitted onto a second clutch block and fixed to the carrier;
a second retainer inserted between the second clutch block and the second needle block; and
a second needle clutch including a plurality of second needle pins installed at the second retainer.

11. The automatic transmission of claim 10, wherein a first needle block comprises:
a first groove that is close to the first retainer;
a second groove that slantly extends from the first groove; and
a third groove that extends from the second groove and accommodates the first needle pin, and
the second needle block comprises:
a fourth groove that is close to the second retainer; and
a fifth groove that slantly extends from the fourth groove, and
a length of the second groove is greater than a length of the fifth groove.

12. The automatic transmission of claim 1, wherein the second clutch comprises:
a second male buffering block having second protrusion portions and connected to the second clutch block;
a second female buffering block fixed to the carrier and connected to the second male buffering block and including second hanging jaws in a state in which the second protrusion portions are hung are on the second hanging jaws; and
a second buffering clutch including a spring installed between one of the second protrusion portions and one of the second hanging jaws.

13. The automatic transmission of claim 1, wherein the second clutch comprises:
a second clutch block into which the fixing shaft is inserted, wherein the gap exists between fixing shaft and the second clutch block;
a third clutch block fitted onto the second clutch block and fixed to the carrier; and
a one way clutch including a second clutch bearing installed between the second clutch block and the third clutch block.

* * * * *